United States Patent [19]

Sawabe

[11] Patent Number: 5,278,876
[45] Date of Patent: Jan. 11, 1994

[54] REACTOR PRESSURE VESSEL VENTED HEAD

[75] Inventor: James K. Sawabe, San Jose, Calif.
[73] Assignee: General Electric Company, San Jose, Calif.
[21] Appl. No.: 29,510
[22] Filed: Mar. 11, 1993
[51] Int. Cl.⁵ .......................................... G21C 13/00
[52] U.S. Cl. .................................. 376/205; 376/294
[58] Field of Search .... 376/205, 294; 976/DIG. 167, 976/DIG. 171-173

[56] References Cited

U.S. PATENT DOCUMENTS 3,225,956  12/1965  Laming ............................... 376/205
3,844,883  10/1974  Bevilacqua et al. ................ 376/205

OTHER PUBLICATIONS

General Electric Company, "BWR/6 General Description of a Boiling Water Reactor," Sep. 1980, pp:i, ii, 1-1, 1-2, 2-1 to 2-3.
Partial, Cut-Away Drawing of a Reactor Pressure Vessel Head of Another Party Having An Internal Vent Line. Believed to be Drawn in 1975.

Primary Examiner—Donald P. Walsh
Assistant Examiner—Frederick H. Voss
Attorney, Agent, or Firm—J. S. Beulick

[57] ABSTRACT

A head for closing a nuclear reactor pressure vessel shell includes an arcuate dome having an integral head flange which includes a mating surface for sealingly mating with the shell upon assembly therewith. The head flange includes an internal passage extending therethrough with a first port being disposed on the head mating surface. A vent line includes a proximal end disposed in flow communication with the head internal passage, and a distal end disposed in flow communication with the inside of the dome for channeling a fluid therethrough. The vent line is fixedly joined to the dome and is carried therewith when the head is assembled to and disassembled from the shell.

11 Claims, 3 Drawing Sheets

REACTOR PRESSURE VESSEL VENTED HEAD

The U.S. Government has rights in this invention in accordance with Contract No. DE-AC03-90SF18495 awarded by the Department of Energy.

The present invention relates generally to boiling water nuclear reactors, and, more specifically, to a removable reactor pressure vessel head.

BACKGROUND OF THE INVENTION

A boiling water nuclear reactor (BWR) includes a pressure vessel containing a nuclear reactor core and water which is boiled thereby for generating steam for producing power such as by driving a turbine-generator for producing electrical power. The pressure vessel typically includes a cylindrical shell having a removable head at the top, and an integral head at the bottom thereof. The top head typically includes an arcuate dome having an integral mounting flange which mates with a complementary supporting flange on the shell. A plurality of circumferentially spaced apart bolts extend through the head flange into the shell supporting flange for bolting the upper head to the shell to form a pressure vessel capable of withstanding the relatively high pressures generated within the pressure vessel during operation of the reactor core.

The upper head typically includes an integral nozzle at the top center thereof which is conventionally joined to a vent line, or a spray line, or both. The vent line communicates with the head nozzle for releasing or venting non-condensable gases such as nitrogen before startup of the reactor core, for example. And, the spray line communicates with the nozzle for injecting or spraying water therein for cooling purposes, for example. In both configurations, the vent and spray lines must be disconnected from the upper head prior to removing the upper head from the shell during a maintenance operation. This increases the complexity and time for accomplishing routine maintenance and increases the duration of radiation exposure to maintenance personnel.

SUMMARY OF THE INVENTION

A head for closing a nuclear reactor pressure vessel shell includes an arcuate dome having an integral head flange which includes a mating surface for sealingly mating with the shell upon assembly therewith. The head flange includes an internal passage extending therethrough with a first port being disposed on the head mating surface. A vent line includes a proximal end disposed in flow communication with the head internal passage, and a distal end disposed in flow communication with the inside of the dome for channeling a fluid therethrough. The vent line is fixedly joined to the dome and is carried therewith when the head is assembled to and disassembled from the shell.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
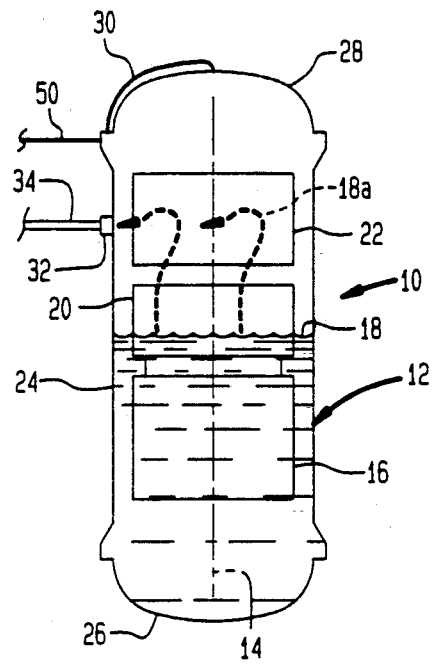
FIG. 1 is a schematic, elevational, partly sectional view of an exemplary boiling water nuclear reactor.

Illustrated schematically in FIG. 1 is an exemplary boiling water nuclear reactor 10 which includes an annular pressure vessel 12 having a longitudinal centerline axis 14. Disposed inside the pressure vessel 12 is a conventional nuclear reactor core 16 submerged in reactor water 18 and effective for generating heat to boil the water 18 for generating steam 18a. Disposed above the core 16 is a conventional assembly of steam separators 20 and in turn a steam dryer assembly 22 to remove moisture from the steam 18a.

The pressure vessel conventionally includes a cylindrical shell 24 and a lower head 26 conventionally welded to the bottom of the shell 24, and an upper head 28 conventionally bolted to the top of the shell 24 and including an integral vent line 30 in accordance with one embodiment of the present invention. The shell 24 also includes a main discharge nozzle 32 to which is conventionally joined a main steam outlet line 34 which channels the steam 18a to a conventional steam turbine-generator, for example, for generating electrical power.

Figure 2:
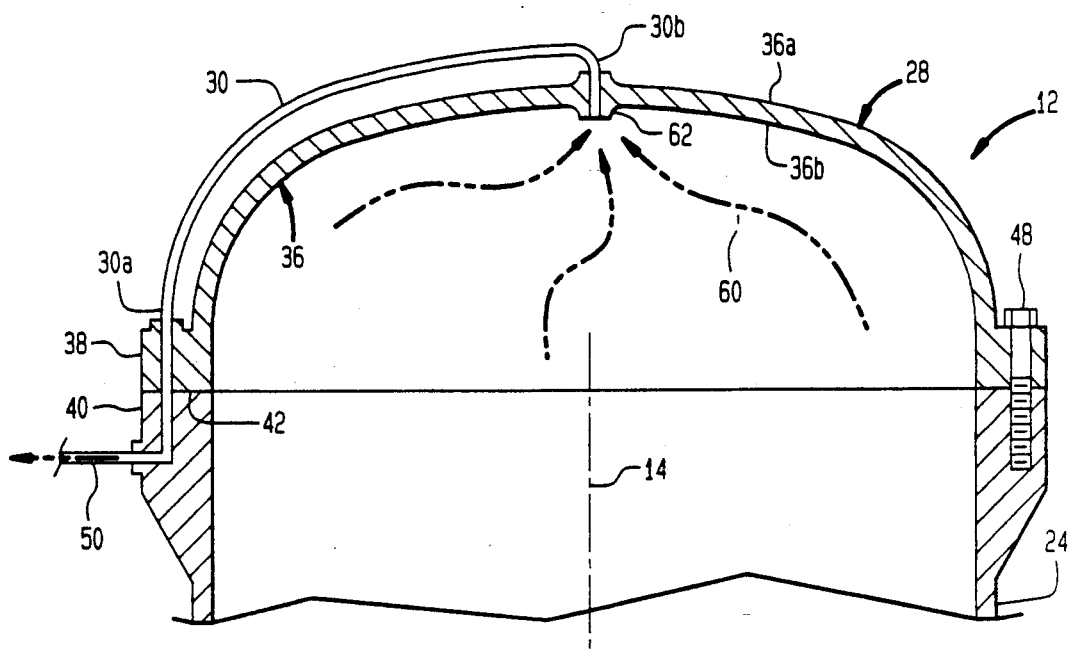
FIG. 2 is an elevational, partly sectional view of the top portion of the reactor pressure vessel shown in FIG. 1 illustrating a vent line disposed integrally with the upper head in accordance with one embodiment of the present invention.

The upper portion of the pressure vessel 12 is illustrated in more particularity in FIG. 2. The upper head 28 includes an arcuate dome 36 suitably configured for withstanding the relatively high pressures generated in the pressure vessel 12 and conventionally includes an integral annular mounting or head flange 38 disposed coaxially with the centerline axis 14 and extending around the perimeter of the dome 36. The shell 24 includes an integral annular supporting or shell flange 40 also disposed coaxially about the centerline axis 14 and extending around the top of perimeter of the shell 24 for supporting the upper head 28.

Figure 3:
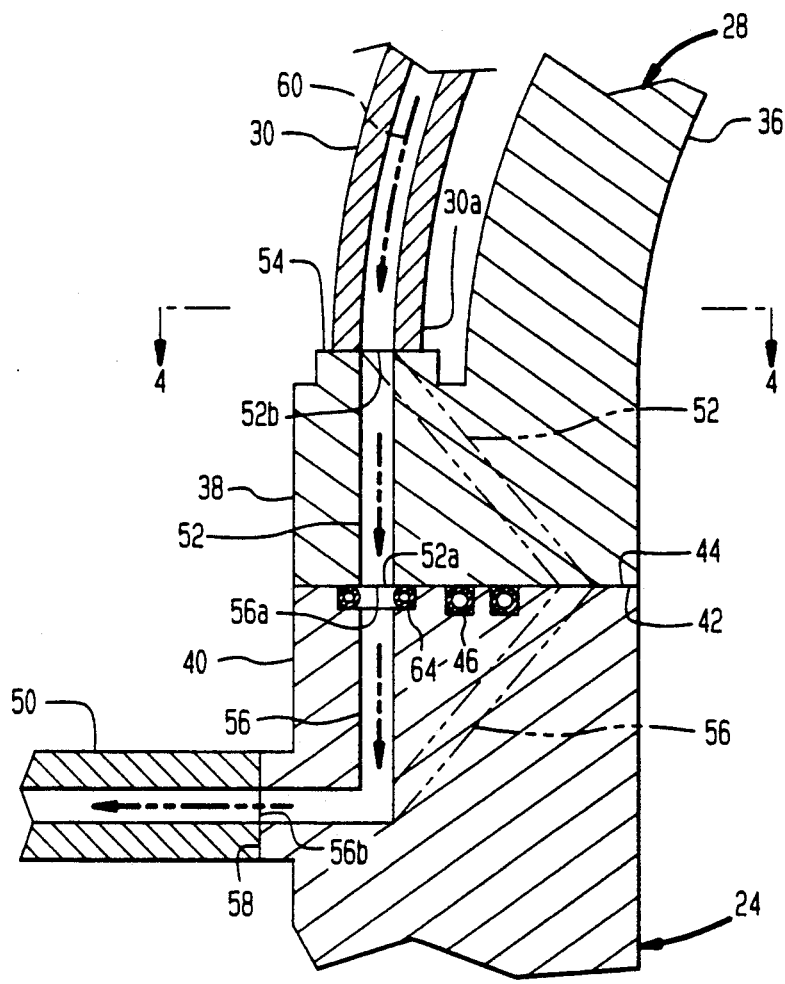
FIG. 3 is an enlarged sectional view of the junction of the upper head and shell shown in FIG. 2 illustrating passage of the vent line therethrough.
Figure 4:
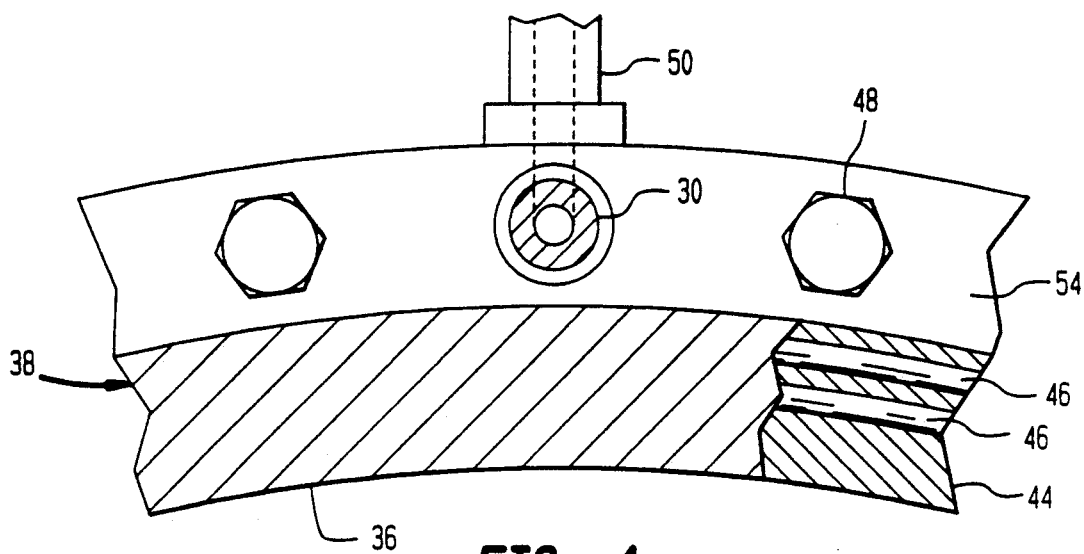
FIG. 4 is a partly sectional, top view of the upper head flange illustrated in FIG. 3 and taken along line 4—4.

As shown in more particularity in FIG. 3, the head flange 38 includes an annular and flat head mating surface 42 at its bottom which faces downwardly for sealingly mating with the shell 24 upon assembly therewith. More specifically, the shell flange 40 includes an annular and flat shell mating surface 44 at its top which faces upwardly for sealingly mating with the head mating surface 42. At least one and preferably two annular conventional head seals 46 are conventionally disposed between the head and shell mating surfaces 42, 44 for providing an effective seal to prevent leakage of the high pressure steam from within the pressure vessel 12 from escaping therefrom between the head and shell flanges 38, 40. In the exemplary embodiment illustrated in FIG. 3, the head seals 46 are disposed in complementary recesses in the shell mating surface 44 and are suitably compressed by the head mating surface 42 when the upper head 28 is installed on the shell flange 40. As shown in FIGS. 2 and 4, a plurality of circumferentially spaced apart, conventional head bolts 48 extend downwardly through the head flange 38 and are threaded into the shell flange 48 for removably fixedly mounting the upper head 28 to the shell flange 40 at the top of the shell 24.

In a conventional design, the upper head 28 is provided with an non-integral vent line which must be suitably disconnected from the upper head 28 prior to removing the upper head 28 from the shell 24. However, in accordance with the present invention, the vent line 30 as illustrated in FIG. 2, for example, is integrally joined to the upper head 28 and may be carried therewith when the head 28 is assembled to and disassembled from the shell 24. This may be accomplished in accordance with the present invention by suitably joining the vent line 30 in flow communication through the shell flange 40 to a stationary, primary vent line 50 conventionally fixedly joined to the shell flange 40. In this way, the primary vent line 50 remains joined to the shell flange 40, whereas the vent line 30 disposed integrally with the upper head 28 is removable therewith. As shown in more particularity in FIG. 3, the head flange 38 includes an internal head flow passage or conduit 52 extending through the head flange 38, with a first opening or port 52a being disposed on the head mating surface 42, and a second, opposite port 52b disposed on a top surface 54 of the head flange 38 spaced above the head mounting surface 42 and parallel therewith. The head flange top surface 54 is disposed outside the dome 36 and also provides the mounting surface against which the several bolts 48 are mounted.

Similarly, the shell flange 40 includes an internal shell flow passage or conduit 56 extending through the shell flange 40 with a shell first port 56a being disposed on the shell mating surface 44 and aligned and disposed in flow communication with the head first port 52a. The shell internal passage 56 also includes a shell second port 56b disposed on a shell outer surface 58, which itself is disposed vertically and substantially perpendicularly to the shell mating surface 44.

The vent line 30 includes a proximal end 30a disposed in flow communication with the head internal passage 52, and a distal end 30b disposed in flow communication with the inside of the dome 36 as shown in FIG. 2 for channeling a fluid 60 therebetween. In the exemplary embodiment illustrated in FIG. 2, the dome 36 includes an integral vent nozzle 62 at its top center which extends therethrough from a convex outer surface 36a of the dome 36 to a concave inner surface 36b of the dome 36. Also in the exemplary embodiment illustrated in FIG. 2, the vent line 30 is disposed externally of the dome 36 and extends along the dome outer surface 36a.

More specifically, the vent line 30 extends between the top surface 54 of the head flange 38 as illustrated in FIG. 3 along the curvature of the dome 36 to the vent nozzle 62 as shown in FIG. 2. The vent line proximal end 30a is conventionally fixedly joined to the head flange 38, by welding for example, in flow communication with the second port 52b at the top surface 54 as shown in FIG. 3, and the distal end 30b as shown in FIG. 2 is disposed in flow communication with the dome nozzle 62 by being conventionally fixedly joined thereto by welding for example. In this way, the fluid 60, which for example may be non-condensable nitrogen gas, may be vented from inside the dome 36 by being channeled through the dome nozzle 62, through the vent line 30 and in turn through the head flange 38 and shell flange 40 through the respective internal passages 52 and 56 therein. The fluid 60 is discharged through the shell flange 40 through the primary vent line 50 joined thereto.

Accordingly, the upper head 28 may be vented through the integral vent line 30 and in turn through the head and shell flanges 38, 40. Since the vent line 30 is fixedly joined to the dome 36 itself, it may be carried therewith when the upper head 28 is assembled to and disassembled from the shell 24. When the bolts 48 are removed from the head flange 38 the entire upper head 28 including the integral vent line 30 may be conventionally lifted away together, with the head first port 52a being automatically separated from the shell first port 56a breaking the connection therebetween. On reassembly of the upper head 28 to the shell flange 40, the head internal passage 52 is suitably realinged with the shell internal passage 56, with the respective first ports 52a, 56a thereof being realigned for reestablishing the flow connection therebetween.

In the preferred embodiment of the invention illustrated in FIG. 3, the pressure vessel 12 further includes an annular vent seal 64 disposed between the head and shell mating surfaces 42, 44 around the respective first ports 52a, 56a thereof for restricting leakage of the fluid 60 from the vent line 30 and between the head and shell flanges 38, 40. In the exemplary embodiment illustrated, the vent seal 64 is suitably disposed in a complementary recess formed into the shell mating surface 44 which is effective for retaining the vent seal 64 therein during assembly and disassembly of the upper head 28, and which is suitably compressed upon assembly of the upper head 28 to the shell 24.

Accordingly, the improved upper head 28 having the integral vent line 30 therein provides an effective vent for the pressure vessel 12 and has a continuous flow passage to carry the fluid 60 to the stationary primary vent line 50, while allowing disassembly of the upper head 28 with the vent line 30 being carried therewith. The vent line 30, itself, therefore does not require separate disconnection as in prior art designs, but is automatically disconnected from the primary vent line 50 upon disassembly of the cooperating head and shell flanges 38, 40.

Figure 5:
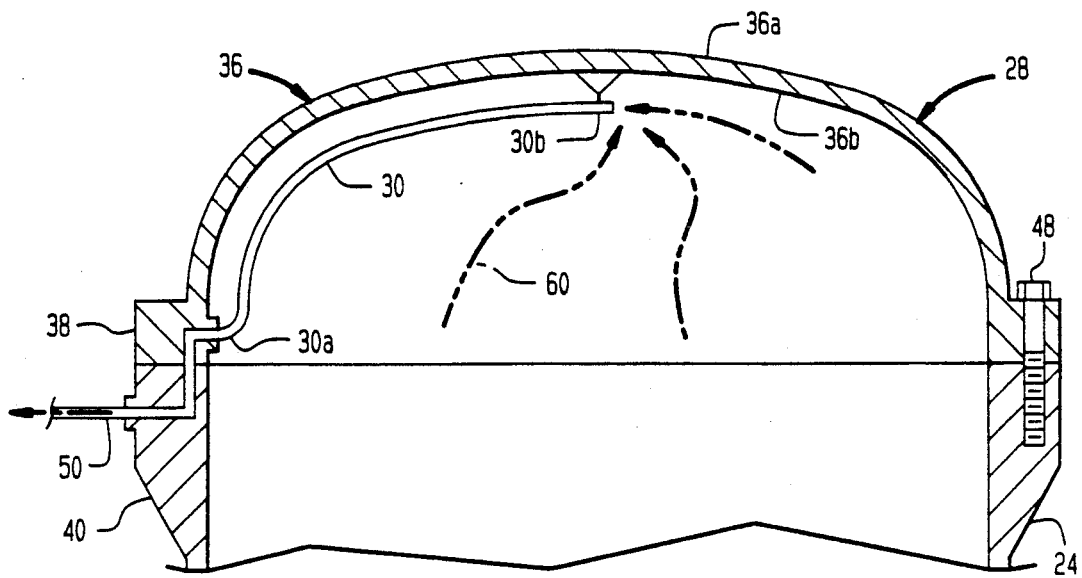
FIG. 5 is an elevational, partly sectional view of the upper head portion of the pressure vessel illustrated in FIG. 1 showing an integral vent line disposed therein in accordance with another embodiment of the present invention.
Figure 6:
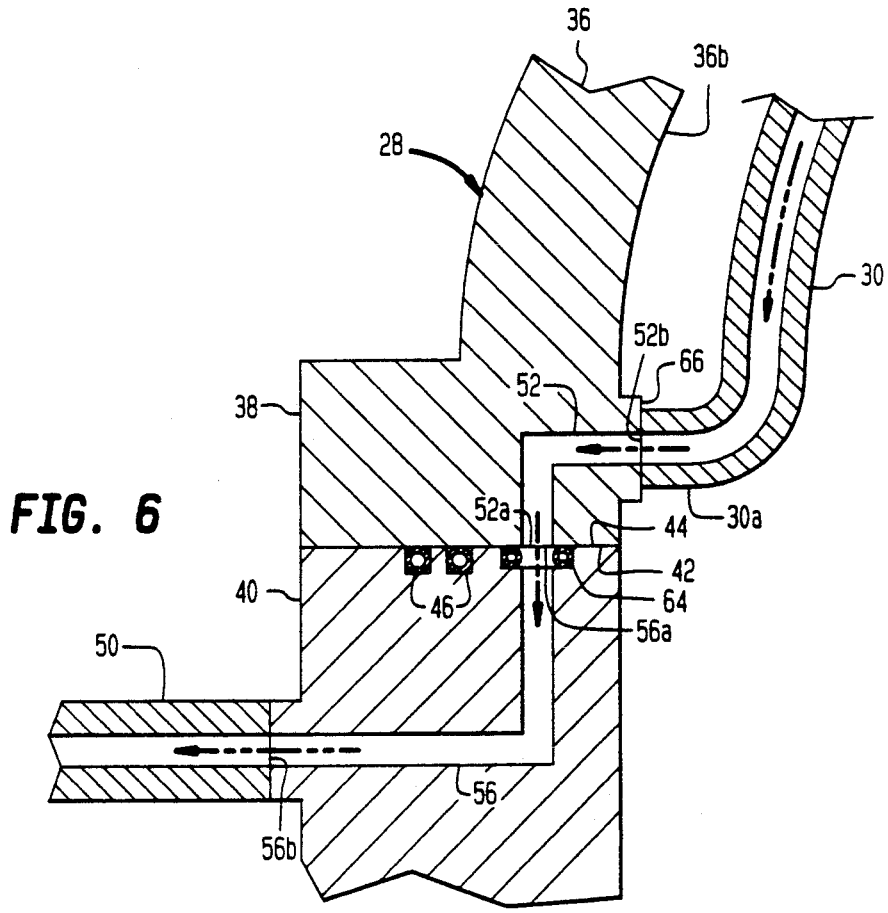
FIG. 6 is an enlarged sectional view of the junction of the upper head and pressure vessel shown in FIG. 5 illustrating passage of the vent line therethrough.

Illustrated in FIGS. 5 and 6 is an alternate embodiment of the present invention wherein the vent line 30 is disposed internally of the dome 36 and extends along the dome inner surface 36b. In this embodiment, the head flange 38 further includes an inside surface 66 facing radially inwardly and disposed above the head mating surface 42 and forms a portion of the dome inner surface 36b. And, the second port 52b of the head internal passage 52 is disposed on the inside surface 66 of the head flange 38. The vent line 30 extends from the flange inside surface 66 along the dome inner surface 36b preferably to the top center thereof as illustrated in FIG. 5, with the proximal end 30a being disposed in flow communication with the second port 52b at the flange inside surface 66 as shown in FIG. 6, and the distal end 30b being open inside the dome 36 in flow communication therewith as illustrated in FIG. 5. In this way, the fluid 60 is vented directly into the vent line distal end 30b and is carried through the vent line 30 and into the head internal passage 52 and in turn through the shell internal passage 56 for discharge through the primary vent line 50.

In the exemplary embodiment illustrated in FIG. 6, the conventional head seals 46 are preferably spaced radially outwardly from the vent seals 64 for providing an additional barrier against leakage of the fluid 60 between the head and shell flanges 38, 40. The head seals 46 provide an effective barrier against leakage of the high pressure steam from inside the pressure vessel 12 through the joint between the head and shell flanges 38 and 40. By positioning the respective first ports 52a, 56a and the cooperating vent seals 64 radially inwardly of the head seals 46, any leakage therefrom will be further sealed by the head seals 46 themselves.

In the embodiment of the invention illustrated in solid line in FIG. 3, the respective first ports 52a, 56a and vent seal 64 are disposed radially outwardly of the head seals 46. However, in an alternate embodiment shown in phantom, the head and shell internal passages 52, 56 may be suitably angled radially inwardly for positioning the respective first ports 52a, 56a radially inwardly of the head seals 46 as in the embodiment illustrated in FIG. 6 to provide improved sealing of the vent line 30 if desired. In the embodiments disclosed above, the internal or external vent lines 30 are fixedly joined to the upper head 28 and, therefore, are removable therewith during assembly and disassembly of the upper head 28 and the shell 24 with automatic disconnection between the head and shell internal passages 52, 56. This will decrease the amount of time required for removing and reinstalling the upper head 28 and therefore also reduces the time which maintenance personnel are subject to radiation exposure. Although the vent line 30 is preferably used for venting the fluid 60 from within the dome 36, it could also be used in alternate embodiments for providing a passage for channeling a fluid such as water for example into the pressure vessel 12 if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A head for closing a nuclear reactor pressure vessel shell comprising:
   an arcuate dome having a convex outer surface and a concave inner surface, and including an integral annular head flange extending around a perimeter thereof, said head flange having an annular head mating surface for sealingly mating with said shell upon assembly therewith and a head internal passage extending through said head flange with a first port on said head mating surface; and
   a vent line having a proximal end disposed in flow communication with said head internal passage, and a distal end disposed in flow communication with an inside of said dome for channeling a fluid therebetween, said vent line being fixedly joined to said dome and carried therewith when said head is assembled and disassembled from said shell.

2. A head according to claim 1 wherein said vent line is disposed externally of said dome and extends along said dome outer surface.

3. A head according to claim 2 wherein:
   said head flange further includes a top surface spaced above said head mounting surface, and said head internal passage includes a second port thereon;
   said dome includes a nozzle extending therethrough from said dome outer surface to said inner surface; and
   said vent line extends between said top surface and said nozzle, with said proximal end being disposed in flow communication with said second port at said top surface, and said distal end being disposed in flow communication with said dome nozzle.

4. A head according to claim 3 in combination with said shell to define a pressure vessel, said shell further comprising:
   an integral annular shell flange extending around a perimeter thereof, said shell flange having an annular shell mating surface sealingly mating with said head mating surface, a shell outer surface disposed perpendicularly to said shell mating surface, and a shell internal passage extending through said shell flange with a shell first port on said shell mating surface disposed in flow communication with said head first port, and a shell second port disposed on said shell outer surface.

5. A pressure vessel according to claim 4 further including an annular vent seal disposed between said head and shell mating surfaces around said respective first ports thereof for restricting leakage of said fluid from said vent line and between said head and shell flanges.

6. A pressure vessel according to claim 5 further including at least one annular head seal disposed between said head and shell mating surfaces and spaced radially outwardly from said vent seal.

7. A head according to claim 1 wherein said vent line is disposed internally of said dome and extends along said dome inner surface.

8. A head according to claim 7 wherein:
   said head flange further includes an inside surface facing radially inwardly above said head mating surface, and said head internal passage includes a second port thereon; and
   said vent line extends from said flange inside surface along said dome inner surface, with said proximal end being disposed in flow communication with said head second port at said flange inside surface, and said distal end being open inside said dome in flow communication therewith.

9. A head according to claim 8 in combination with said shell to define a pressure vessel, said shell further comprising:
   an integral annular shell flange extending around a perimeter thereof, said shell flange having an annular shell mating surface sealingly mating with said head mating surface, a shell outer surface disposed perpendicularly to said shell mating surface, and a shell internal passage extending through said shell flange with a shell first port on said shell mating surface disposed in flow communication with said head first port, and a shell second port disposed on said shell outer surface.

10. A pressure vessel according to claim 9 further including an annular vent seal disposed between said head and shell mating surfaces around said respective first ports thereof for restricting leakage of said fluid from said vent line and between said head and shell flanges.

11. A pressure vessel according to claim 10 further including at least one annular head seal disposed between said head and shell mating surfaces and spaced radially outwardly from said vent seal.

* * * * *